United States Patent [19]
Bruss et al.

[11] Patent Number: 5,653,881
[45] Date of Patent: Aug. 5, 1997

[54] STRAINING VESSEL

[76] Inventors: William Bruss; Marianne Bruss, both of 470 Wilmar, Winfield, Ill. 60190

[21] Appl. No.: 667,441

[22] Filed: Jun. 21, 1996

[51] Int. Cl.$^6$ .............................. A47J 27/00; A47J 27/06; B01D 35/02
[52] U.S. Cl. .............................. 210/467; 99/403; 99/410; 210/464; 210/469
[58] Field of Search .............................. 99/403, 410–418; 210/464–469

[56] References Cited

U.S. PATENT DOCUMENTS

| | | | |
|---|---|---|---|
| 1,994,576 | 3/1935 | Deaqn | 210/469 |
| 2,185,897 | 1/1940 | Krause et al. | 210/469 |
| 2,303,841 | 12/1942 | Kircher | 210/469 |
| 4,310,418 | 1/1982 | Busbey | 210/467 |

*Primary Examiner*—Timothy F. Simone
*Attorney, Agent, or Firm*—Laff, Whitsel, Conte & Saret, Ltd.

[57] ABSTRACT

The invention is a single utensil that combines the features of a cooking vessel with those of a strainer. The invention comprises a pot having a spout. The lid for the pot has a downwardly extending skirt which includes a straining section. The lid also has locking means on the skirt which cooperate with locking means provided on the inside of the pot. In use, the lid is placed on the pot so that the straining section is not in communication with the spout. In this position, the skirt will seal the opening created by the spout. Once the cooking is done and the user wishes to drain off the excess liquid, he or she rotates the lid to align the strainer section of the skirt with the spout. When the lid is so positioned, the locking means on the skirt of the lid will engage the cooperating locking means on the inside of the pot to lock the lid in place. The pot and lid can then be lifted as a unit to drain the liquid from the pot.

31 Claims, 2 Drawing Sheets

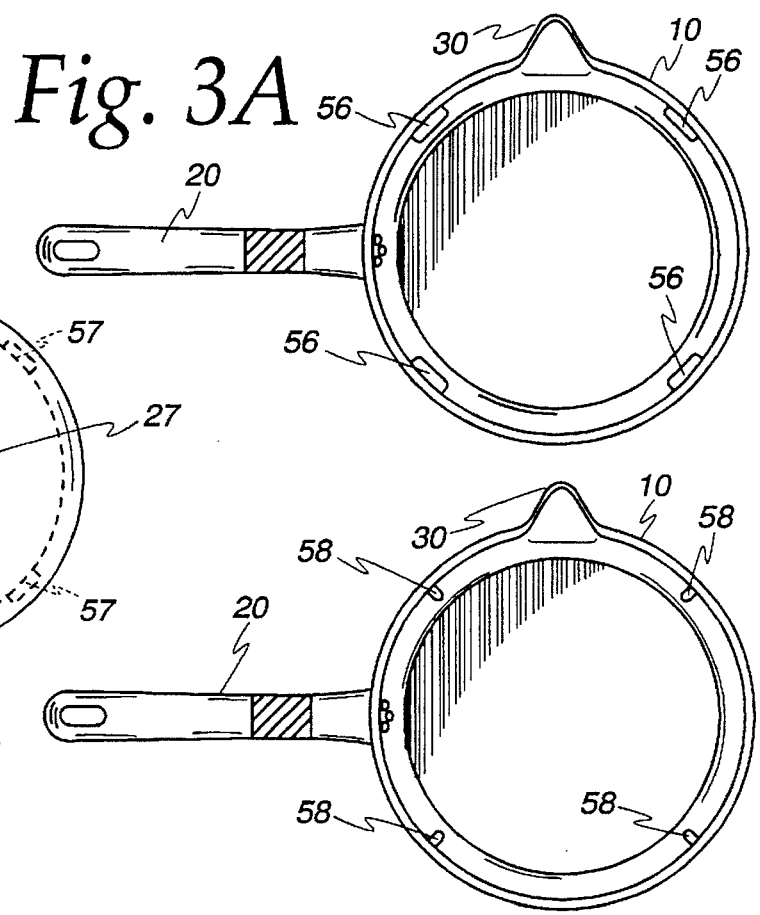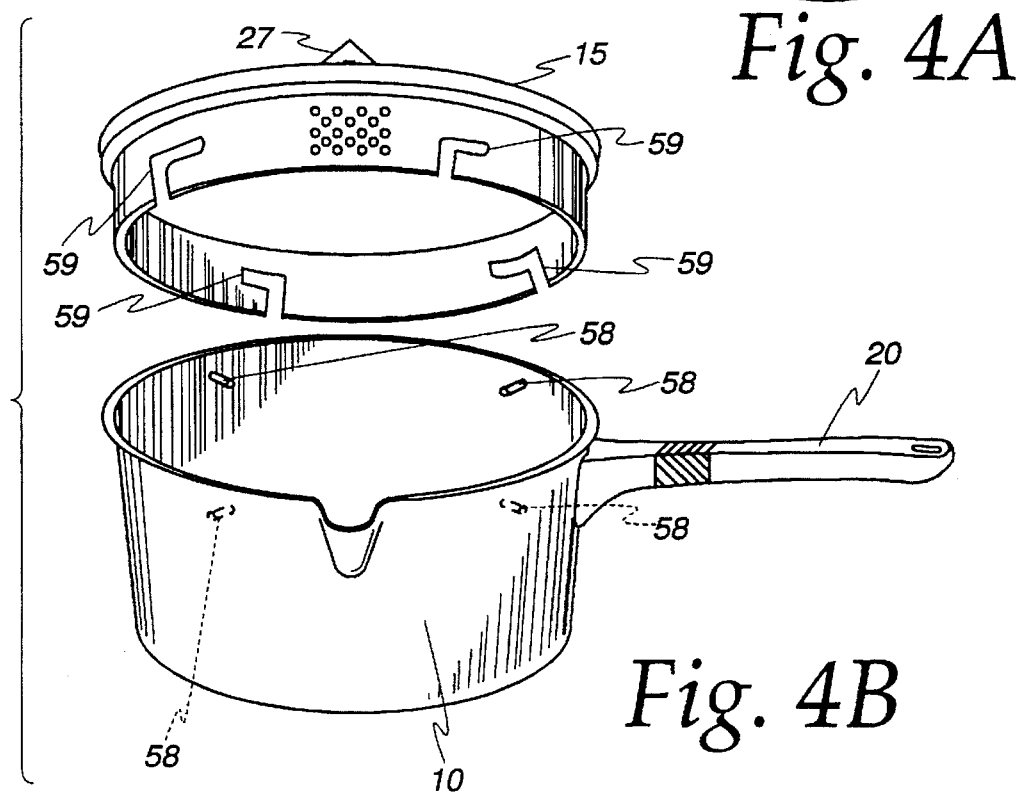

STRAINING VESSEL

The invention relates to a vessel which will also function as a strainer. It is especially applicable to cooking vessels which are used for preparing meals in the home or other environments.

BACKGROUND OF THE INVENTION

In preparing a meal, a person is often called on to both heat and strain food items. For example, when preparing a pasta dish, the chef cooks the pasta noodles in boiling water and then strains the water from the pot. Another example is the preparation of ground beef: while browning the ground beef, liquid fat is produced which must be strained from the pot before the beef can be served.

Presently, the chef heats the food items with one kitchen utensil and then strains them with another. For instance, a cook will boil water and pasta noodles together in a large pot. When the pasta noodles have been fully cooked, the cook will then pour the pasta noodles and the boiling water from the large pot into a strainer, thereby straining the water from the cooked noodles.

This common process has many drawbacks, the most obvious being that it requires the cook to handle two awkward kitchen utensils at one time. Successfully performing the task requires both strength and dexterity. When one considers the fact that one of these utensils is also extremely hot, one realizes that this process is also dangerous.

THE PRIOR ART

Several devices in the prior art have attempted to solve these problems by combining a cooking vessel and a strainer into a single kitchen utensil, one that can be used both to cook and strain food. One such device is described in U.S. Pat. No. 4,626,352, granted to Massey. The Massey patent discloses a saucepan that can also serve as a strainer. The saucepan has a lid that can be rotated about a horizontal axis. A skirt extends down from the lid and fits into the saucepan. Located on the skirt is a straining section.

To enable straining, the lid is rotated in one direction so that the straining section is opposite the lip of the saucepan, then rotated first in one direction and then in a second direction so that the straining section emerges from the saucepan. The saucepan and lid must then be tilted in unison in order to strain the contents of the saucepan through the straining section.

U.S. Pat. No. 4,873,918, granted to Goldman also discloses a saucepan that can act as a strainer. The saucepan has a spout and an ordinary lid. The area of the saucepan wall adjacent the spout is perforated so as to form a straining section. The spout can be opened and closed by means of a hinged spout cover. To strain the contents of the saucepan, the lid is placed on the saucepan and the spout is tilted downward. In this position, gravity will force the liquid through the straining area and out the spout.

These prior art attempts at solving the problem all have several drawbacks. For instance, both require a user to possess a considerable amount of strength and dexterity in order to operate them. The device described in the Massey patent requires the user to support the saucepan with one hand while pivoting the lid to engage the straining section with the other. The user must then tilt the saucepan and the lid in unison in order to strain the contents of the saucepan. This entire process requires a great deal of dexterity. Since it demands that the user support the saucepan with only one hand, the process also requires a considerable amount of strength: as one can imagine, when a saucepan is filled with enough pasta to feed a family of four, plus the volume of water needed to cook that amount of pasta, supporting that saucepan with just one hand is no easy task.

The device described in the Goldman patent has similar drawbacks. Straining food with this device requires the user to support and tilt the saucepan with one hand while keeping the lid securely in place with the other. While not quite as cumbersome as that required by the Massey device, this procedure is still quite awkward, especially when one considers that the user must keep the lid in place while at the same time avoiding any contact with the extremely hot saucepan. Thus, this process, too, requires a considerable amount of dexterity. And, as with the Massey device, the Goldman device requires the user to support and tilt the saucepan with just one hand. As explained above, this requires a considerable amount of strength.

Another problem with the Goldman device is that the hinged spout cover does not sufficiently seal the spout. When a person is handling the saucepan, boiling water can easily escape through the spout if the person accidentally tilts the saucepan too much to the side. During the cooking process, water boiling in the pot can force the cover open, thereby allowing both boiling water and cooking heat to escape the device. All these events could affect the cooking process, cause injury, and/or increase the amount of cleaning required.

OBJECTS OF THE INVENTION

An object of the invention is to provide a device which allows a chef both to cook and strain foodstuffs.

Another object of the invention is to provide a device for both cooking and straining foodstuffs which is easy to use.

A further object of the invention is to provide a device for both cooking and straining foodstuffs which is safe to use.

Yet another object of the invention is to provide a device which combines the features of a cooking vessel with those of a strainer.

Another object of the invention is to provide such a device, the use of which requires a minimal amount of dexterity on the part of the user.

Still another object of the invention is to provide such a device, the use of which requires a minimal amount of strength on the part of the user.

Another object of the invention is to provide such a device, the use of which requires just one hand.

These and other objects, features and advantages of the invention will become apparent from the following description.

SUMMARY OF THE INVENTION

The invention described herein provides a single utensil that combines the features of a cooking vessel with those of a strainer. The invention achieves this while overcoming the disadvantages of the prior art devices. In a preferred embodiment, the invention comprises a pot having a spout. The lid for the pot has a downwardly extending skirt which includes a straining section. The lid also has locking tabs protruding outwardly from the skirt which cooperate with inwardly extending locking tabs provided on the inside of the pot.

In use, the lid is placed on the pot so that the straining section is not in communication with the spout. In this position (the closed position), the skirt will seal the opening created by the spout. This allows the user to use the pot for cooking purposes without allowing steam, liquid or foodstuff to escape through the spout.

Once the cooking is done and the user wishes to drain off the excess liquid, he or she rotates the lid to align the strainer section of the skirt with the spout. When the lid is so positioned (in the straining position), the locking tab on the skirt of the lid will engage the cooperating locking tabs on the inside of the pot to lock the lid in place. The pot and lid can then be lifted as a unit to drain the liquid from the saucepan. Because the lid is locked in place, the user can lift the pot with both hands without having to worry about the lid failing off the pot as the liquid is being drained.

Another feature of the invention involves a pointer-shaped handle for the lid. The handle is oriented so that it points towards the straining section, thereby letting the user know whether the lid is in the straining or closed position. Also, the lid handle is color-coded with the handle of the pot, thereby letting the user easily match different lids with different pots.

Finally, the inside of the pot is marked with volume indicators such as cup, pint, quart, etc.

BRIEF DESCRIPTION OF THE DRAWINGS

FIGS. 3A and B are top plan views of the pot and lid respectively of a third embodiment of this invention.

FIG. 4A is a top plan view of a pot in accordance with a fourth embodiment this invention.

And FIG. 4B is an exploded perspective view of an assembly comprising the pot of FIG. 4A and a lid therefor.

DETAILED DESCRIPTION OF THE INVENTION

Figure 1:
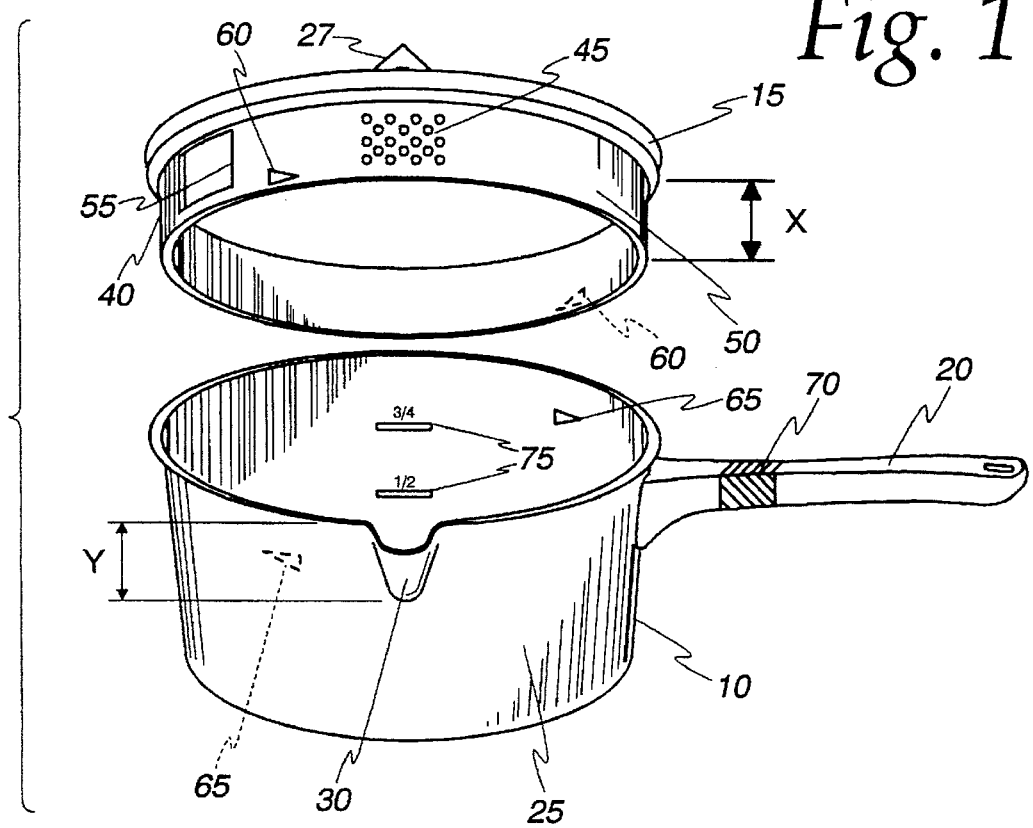
FIG. 1 is an exploded perspective view of a pot and lid assembly in accordance with a first embodiment of this invention.

In general, the invention comprises a vessel and a means for sealing the vessel. The vessel can be of any number of types, including, but not limited to, a pot, a pan or a skillet. Similarly the sealing means can be any suitable means known in the art, including, but not limited to, a lid, cover, top or cap. For illustrative purposes, the vessel and sealing means are shown in FIG. 1 as pot 10 and removable lid 15, respectively.

In a preferred embodiment, the invention further comprises a means for tilting the vessel. The tilting means can be any suitable means, from something as simple as a handle by which a user can manually tilt the vessel, to something as complex as a motor operatively connected to the vessel so as to selectively tilt the vessel. In FIG. 1, the tilting means is shown as pot handle 20 on wall 25 of pot 10.

In a preferred embodiment, the invention further comprises a means for rotating the sealing means within the vessel about a vertical axis. The rotating means can be any suitable means, from something as simple as a handle by which a user can manually rotate the sealing means, to something as complex as a motor operatively connected to the sealing means so as to selectively rotate the sealing means. In FIG. 1, the rotating means is shown as lid handle 27 on lid 15.

The invention further comprises a means for allowing foodstuff located in the vessel to be poured out of the vessel when the sealing means is sealing the vessel. In the most preferred embodiment, the pouring means is spout 30, shown in FIG. 1, located on wall 25, but it could just as easily be a simple aperture 35, shown in the alternate embodiment of FIG. 2, or any other suitable means known in the art.

Figure 2:
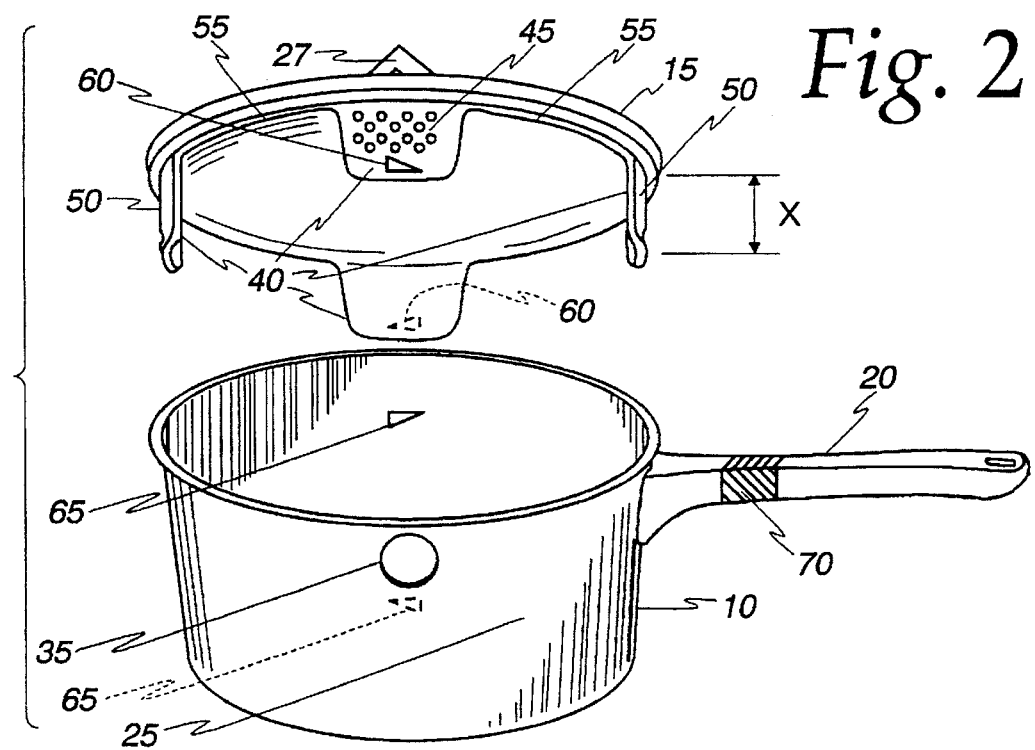
FIG. 2 is an exploded perspective view of a pot and lid assembly in accordance with a second embodiment of this invention.

Skirt 40 depends from the sealing means. Skirt 40 can be a full skirt, as shown in FIG. 1, or it can be one or more partial skirts, as shown in FIG. 2. Either way, skirt 40 must depend from the sealing means so as to fit within the vessel when the sealing means is sealing the vessel. In the most preferred embodiment, skirt 40 depends from lid 15 so as to fit snugly against wall 25 of pot 10.

The invention also requires that skirt 40 be capable of being placed adjacent the pouring means when the sealing means is sealing the vessel. In the most preferred embodiment, this requires the depth of skirt 40 (measurement "x") to exceed the distance between the top of wall 25 and the bottom of spout 30 (measurement "y"). These dimensions ensure that when lid 15 is placed on pot 10, lid 15 can be rotated in pot 10 so as to place skirt 40 adjacent to spout 30.

Located on skirt 40 is a perforated straining section 45, through which the contents of the vessel can be strained during use of the invention. Straining section 45 must be located on skirt 40 such that straining section 45 can be placed in communication with the pouring means when the sealing means is sealing the vessel. In the most preferred embodiment, straining section 45 must be located on skirt 40 such that when lid 15 is sealing pot 10, lid 15 can be rotated within pot 10 to a position in which straining section 45 is in communication with spout 30. This position is the "straining position".

In a preferred embodiment, solid section 50 is also located on skirt 40. Solid section 50 allows a user of the invention to close off the pouring means during the cooking process, thereby preventing steam, boiling water or any other material located within the vessel from escaping through the pouring means. As with straining section 45, solid section 50 must be located on skirt 40 such that solid section 50 block the pouring means when the sealing means is sealing the vessel. In the most preferred embodiment, solid section 50 must be located on skirt 40 such that when lid 15 is sealing pot 10, lid 15 can be rotated within pot 10 to a position in which solid section 50 blocks spout 30. This position is the "closed position."

In a preferred embodiment, a pouring opening 55 is also located on skirt 40. Pouring opening 55 allows a user to pour the unstrained contents of the vessel out through the pouring means when the sealing means is sealing the vessel. Pouring opening 55 can be an opening located on a full skirt, as seen in FIG. 1, or it can be an opening created by the use of one or more partial skirts, as seen in FIG. 2. Either way, pouring opening 55 must be located such that it can be placed in communication with the pouring means when the sealing means is sealing the vessel. In the most preferred embodiment, pouring opening 55 must be located on skirt 30 such that when lid 15 is sealing pot 10, lid 15 can be rotated within pot 10 to a position in which pouring opening 55 is in communication with spout 30. This position is the "pouring position."

In a preferred embodiment, the invention is equipped with means for securing the sealing means to the vessel. The securing means will allow a user to tilt the vessel without having to manually keep the sealing means in place. The securing means can be any suitable means known in the art including, but not limited to, one or more latches, clamps or magnets.

Preferably, the securing means is automatically engaged whenever straining section 45 is placed in communication with the pouring means. The automatic securing means can be any suitable means known in the art including, but not limited to, the examples discussed herein, which are given solely for illustrative purposes.

In the most preferred embodiment, the securing means comprises one ore more triangular locking tabs 60 protruding outwardly from skirt 30, which cooperate with corresponding triangular locking tabs 65 provided on inside surface of wall 25. (See FIGS. 1 & 2). The locking tabs are located such that when lid 15 is rotated to the straining position, locking tabs 60 will engage corresponding locking tabs 65 to secure lid 15 in place. To disengage the locking tabs, lid 15 is rotated out of the straining position.

Another type of automatic securing means comprises a plurality of rectangular tabs 56 extending partially about the rim of pot 10. (See FIGS. 3A and B). A plurality of corresponding rectangular tabs 57 are located along the rim of lid 15. These tabs are positioned so that when a user rotates lid 15 into the straining position, tabs 57 engage tabs 56, thereby securing lid 15 to pot 10.

Still another possible automatic securing means comprises a plurality of knobs 58 located on the inner surface of wall 25 and a plurality of corresponding L-shaped slots 59 located on skirt 40. (See FIGS. 4A and B). Knobs 58 and slots 59 are positioned such that when a user rotates lid 15 into the straining position, knobs 58 engage the horizontal portions of slots 59, thereby securing lid 15 to pot 10.

In a preferred embodiment, the invention will also comprise a means for indicating when lid 15 is in the straining position. In the most preferred embodiment, the position indicating means comprises lid handle 27 shaped triangularly and oriented so as to point towards straining section 45. (See FIG. 3B). In use, when lid 15 is in place on pot 10, a user can place lid 15 in the straining position, merely by rotating lid 15 until lid handle 27 is pointing directly at spout 30.

When one owns a number of cooking utensils, each with its own corresponding lid, it is often difficult to determine which lid fits on which cooking utensil. Therefore, in a preferred embodiment, the invention further comprises a means for indicating that the sealing means fits the vessel. In the most preferred embodiment, the fit indicating means comprises colored indicator 70 located on pot handle 20. The color of lid handle 27 match the color of indicator 70. Thus, when the color of a particular pot's indicator 70 matches that of a particular lid's handle 27, a user will know that that particular lid will fit on that particular pot.

Since it is often convenient to be able to determine the volume of the contents of the vessel, a preferred embodiment of the invention further comprises one or more volume indicating marks 75 (such as "cup," "pint," "quart," etc.) located on wall 25 of pot 10. (See FIG. 1). If pot 10 is made of a clear material, volume indicating marks 75 can be placed on the inner surface or the outer surface of wall 25. If pot 10 is not made of a clear material, volume indicating marks 75 should be placed on the inner surface of wall 25.

Operation of the Invention

The invention is very simple to use. For example, if the invention is going to be used to cook spaghetti, the first step is to fill pot 10 with a volume of water. Lid 15 is then placed on pot 10. Using pot handle 27, lid 15 is rotated within pot 10 until lid 15 is in the closed position, thereby using solid section 50 to block spout 30. This will close off the spout and prevent cooking heat from escaping while the water is brought to a boil. Pot 10 is then placed over heat and the water is brought to a boil.

Once the water is boiling, lid 15 is removed using pot handle 27. Spaghetti is then placed into the boiling water in pot 10 and lid 15 is replaced. Using lid handle 27, lid 15 is rotated within pot 10 until lid 15 is once again in the closed position. This seals off the spout while the spaghetti is cooking.

When the spaghetti is fully cooked, pot 10 is removed from the heat and moved over a sink. Lid 15 is then rotated within pot 10 about a vertical axis until pot handle 27 is pointing directly at spout 30. This will accomplish several things. First, it will put lid 15 in the straining position, thereby placing straining section 45 in communication with spout 30. Second, locking tabs 60 will engage corresponding locking tabs 65, thereby securing lid 15 to pot 10. The invention can now be used as a strainer.

Using pot handle 20, pot 10 is tilted so that the water in pot 10 will flow out through straining section 45 and spout 30 and into the sink. Straining section 45 will allow the water to exit through spout 30 while keeping the cooked spaghetti inside pot 10.

Because lid 15 is secured to pot 10 by the locking tabs, the user does not have to attempt to secure lid 15 with one hand while tilting pot 10 with the other hand. Avoiding this awkward procedure will help prevent the user from accidentally coming into contact with the hot water, the hot pot 10, and/or the hot lid 15, thereby preventing accidental injuries. Furthermore, not having to manually secure lid 15 to pot 10 leaves the user free to grasp pot handle 20 with both hands if pot 10 and its contents are too heavy to be supported with just one hand.

Those who are skilled in the art will readily perceive how to modify the invention. Therefore, the appended claims are to be construed to cover all equivalent structures which fall within the true scope and spirit of the invention.

What is claimed is:

1. A combined cooking and straining apparatus comprising:

a. a vessel having at least one solid wall, the wall having a rim defining a loading opening through which contents can be placed in the vessel;

b. means for sealing the loading opening, the sealing means being capable of being placed in at least a straining position while sealing the loading opening;

c. means for allowing the contents of the vessel to be poured out of the vessel when the sealing means is sealing the loading opening, the pouring means being located on the wall of the vessel;

d. one or more partial skirts depending from the sealing means and located such that at least one partial skirt fits within the vessel and is adjacent the pouring means when the sealing means is in a position to seal the loading opening;

e. a straining section located in at least one of the partial skirts such that the straining section is in communication with the pouring means when the sealing means is rotated about a vertical axis to the straining position.

2. The apparatus of claim 1, further comprising a handle located on the sealing means to facilitate rotating said sealing means about a vertical axis to the straining position.

3. The apparatus of claim 1 further comprising a means for securing the sealing means to the vessel.

4. The apparatus of claim 1, further comprising a means for automatically securing the sealing means to the vessel when the sealing means is placed in the straining position.

5. The apparatus of claim 1 further comprising a means for indicating when the sealing means is in the straining position.

6. The apparatus of claim 5, wherein the position indicating means comprises a handle located on the sealing means, the handle being shaped and oriented so as to point towards the straining section.

7. The apparatus of claim 1 further comprising a means for indicating that the sealing means will fit the vessel.

8. The apparatus of claim 7, wherein the fit indicating means comprises a colored indicator located on the sealing means and a colored indicator located on the vessel, the colored indicators being the same color.

9. The apparatus of claim 1, wherein the sealing means is capable of being placed in at least the following positions when sealing the vessel: the straining position and a closed position; and further comprising a solid section located on at least one of the partial skirts such that the solid section blocks the pouring means when the sealing means is in the closed position.

10. The apparatus of claim 9, further comprising a means for automatically securing the sealing means to the vessel when the sealing means is placed in the straining position.

11. The apparatus of claim 10, wherein the automatically securing means comprises one or more first locking tabs protruding outwardly from the at least one of the partial skirts and one or more second locking tabs protruding inwardly from the inner surface of the wall of the vessel, the first locking tabs and the second locking tabs being positioned so that the first locking tabs engage the second locking tabs when the sealing means is placed in the straining position.

12. The apparatus of claim 10, wherein the automatically securing means comprises one or more protrusions located on the inner surface of the wall of the vessel and one or more corresponding holes defined by the outer surface of the at least one of the partial skirts, the protrusions and holes being positioned so that the protrusions engage the holes when the sealing means is placed in the straining position.

13. The apparatus of claim 10, wherein the automatically securing means comprises one or more lips extending inwardly from the rim of the wall and one or more corresponding tabs for extending outwardly from the securing means to lips and tabs being positioned so that the lips engage the tabs when the sealing means is placed in the straining position.

14. A combined cooking and straining apparatus comprising:
   a. a vessel having at least one solid wall defining a loading opening through which contents can be placed in the vessel;
   b. means for sealing the loading opening, the sealing means being capable of being placed in at least a straining position when sealing the loading opening;
   c. means for allowing the contents of the vessel to be poured out of the vessel when the sealing means is sealing the loading opening, the pouring means being located on the wall of the vessel;
   d. a skirt depending from the sealing means and located such that the skirt fits within the vessel and is adjacent the pouring means when the sealing means is in position to seal the loading opening;
   e. a straining section located on the skirt such that the straining section is in communication with the pouring means when the sealing means is in the straining position; and
   f. one or more first locking tabs protruding outwardly from the skirt and one or more second locking tabs protruding inwardly from the inner surface of the wall of the vessel, the first locking tabs and the second locking tabs being positioned so that the first locking tabs cooperate with the second locking tabs when the sealing means is placed in the straining position to secure the sealing means to the vessel when the sealing means is placed in the straining position.

15. The apparatus of claim 14 further comprising a means for indicating when the sealing means is in the straining position.

16. The apparatus of claim 15, wherein the position indicating means comprises a handle located on the sealing means, the handle being shaped and oriented so as to point towards the straining section.

17. The apparatus of claim 14 further comprising a means for indicating that the sealing means will fit the vessel.

18. The apparatus of claim 17, wherein the fit indicating means comprises a colored indicator located on the sealing means and a colored indicator located on the vessel, the colored indicators being the same color.

19. The apparatus of 14, wherein the sealing means is capable of being placed in at least the following positions when sealing the vessel: the straining position and a closed position; and further comprising a solid section located on the skirt such that the solid section blocks the pouring means when the sealing means is in the closed position.

20. A combined cooking and straining apparatus comprising:
   a. a vessel having at least one solid wall defining a loading opening through which contents can be placed in the vessel;
   b. means for sealing the loading opening, the sealing means being capable of being placed in at least any of the following positions when sealing the loading opening: a straining position, a closed position and a pouring position;
   c. means for allowing the contents of the vessel to be poured out of the vessel when the sealing means is sealing the loading opening, the pouring means being located on the wall of the vessel;
   d. a skirt depending from the sealing means and located such that the skirt fits within the vessel and is adjacent the pouring means when the sealing means is in any of the following positions: the straining position, the closed position and the pouring position;
   e. a straining section located on the skirt such that the straining section is in communication with the pouring means when the sealing means is in the straining position;
   f. a solid section located on the skirt such that the solid section blocks the pouring means when the sealing means is in the closed position;
   g. a pouring opening defined by the skirt and located on the skirt such that the pouring opening is in communication with the pouring means when the sealing means is in the pouring position; and
   h. a means for securing the sealing means to the vessel.

21. The apparatus of claim 20, wherein the securing means secures the sealing means to the vessel when the sealing means is placed in the straining position.

22. The apparatus of claim 20 further comprising a means for indicating when the sealing means is in the straining position.

23. The apparatus of claim 22, wherein the position indicating means comprises a handle located on the sealing means, the handle being shaped and oriented so as to point towards the straining section.

24. The apparatus of claim 21, wherein the securing means comprises one or more first locking tabs protruding outwardly from the skirt and one or more second locking tabs protruding inwardly from the inner surface of the wall of the vessel, the first locking tabs and the second locking tabs being positioned so that the first locking tabs engage the second locking tabs when the sealing means is placed in the straining position.

25. The apparatus of claim 21, wherein the securing means comprises one or more protrusions located on the inner surface of the wall of the vessel and one or more corresponding holes defined by the outer surface of the at least one of the partial skirts, the protrusions and holes being positioned so that the protrusions engage the holes when the sealing means is placed in the straining position.

26. The apparatus of claim 21, wherein the securing means comprises one or more lips extending inwardly from the rim of the wall and one or more corresponding tabs extending outwardly from the sealing means so that the lips will cooperate with the tabs when the sealing means is placed in the straining position to secure the sealing means to the vessel.

27. The apparatus of claim 20 further comprising one or more volume indicating marks located on the wall of the vessel.

28. The apparatus of claim 20 further comprising a means for indicating that the sealing means will fit the vessel.

29. The apparatus of claim 24, wherein the fit indicating means comprises a colored indicator located on the sealing means and a colored indicator located on the vessel, the colored indicators being the same color.

30. The apparatus of claim 14 further comprising one or more volume indicating marks located on the wall of the vessel.

31. The apparatus of claim 1 further comprising one or more volume indicating marks located on the wall of the vessel.

* * * * *